United States Patent
Lehmann et al.

(10) Patent No.: US 6,953,107 B2
(45) Date of Patent: Oct. 11, 2005

(54) MAGNET TRACK BRAKING DEVICE

(75) Inventors: Henry Lehmann, Zwickau (DE); Hermann Koidl, Vienna (AT)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 0 days.

(21) Appl. No.: 10/469,861

(22) PCT Filed: Mar. 8, 2002

(86) PCT No.: PCT/EP02/02564
§ 371 (c)(1),
(2), (4) Date: Jan. 15, 2004

(87) PCT Pub. No.: WO02/072404
PCT Pub. Date: Sep. 19, 2002

(65) Prior Publication Data
US 2004/0112691 A1 Jun. 17, 2004

(30) Foreign Application Priority Data
Mar. 9, 2001 (DE) ......................... 101 11 685

(51) Int. Cl.⁷ .............................................. F16D 69/04
(52) U.S. Cl. ....................................................... 188/165
(58) Field of Search .......................... 310/77, 93, 103, 310/105; 188/156, 158, 160, 161, 164, 165, 251 A, 251 M

(56) References Cited

U.S. PATENT DOCUMENTS

| 3,723,795 A | * | 3/1973 | Baermann ...................... 310/93 |
| 3,889,140 A | * | 6/1975 | Baermann ..................... 310/103 |
| 6,364,072 B1 | * | 4/2002 | Grupp et al. ............... 188/165 |
| 6,648,108 B2 | * | 11/2003 | Grupp et al. ............... 188/165 |

FOREIGN PATENT DOCUMENTS

| DE | 0875691 A1 | * | 11/1998 |
| EP | 0 114 259 A1 | | 8/1984 |
| EP | 0 716 970 A1 | | 6/1996 |
| EP | 0 875 691 A1 | | 11/1998 |
| FR | 2 495 559 | | 12/1980 |

* cited by examiner

Primary Examiner—Chris Schwartz
(74) Attorney, Agent, or Firm—Barnes & Thornburg; Perry Palan

(57) ABSTRACT

The disclosure relates to a magnet track braking device comprising a magnetic base and/or support body and a pole shoe section containing a magnetic flow guiding area and a magnetic flow separating area. The disclosure is characterized in that the magnetic base and/or support body is made from materials having different magnetic characteristics, so that an increase in induction in the gap between the magnet track brake and the rail head is reduced when erosion occurs in the pole shoe section.

5 Claims, 1 Drawing Sheet

MAGNET TRACK BRAKING DEVICE

BACKGROUND OF THE DISCLOSURE

The disclosure relates to an electromagnetic rail braking device having a magnetic base body and/or support body, a pole shoe section, the pole shoe section comprising a magnetic-flux-guiding area as well as a magnetic-flux-cutting area.

In principle, electromagnetic rail brakes involve an electromagnet consisting of a coil extending in the rail direction and horseshoe-like magnetic cores. The direct current flowing in the magnetic coil causes a magnetomotive force which generates a magnetic flux in the magnetic core, which magnetic flux path is closed by the rail head. The amount of the braking force of an electromagnetic rail brake depends on the magnetic reluctance of the magnetic circuit. That is, the geometry and permeability, the electric flux, the coefficient of friction between the magnetic shoe and the rail as well as the rail condition.

In principle, a differentiation can be made between two different types of magnets based on the construction of the brake magnets. In a first embodiment, the magnetic core consists of two steel cheeks which are firmly screwed to the coil body on both sides. As an alternative, the brake magnet can also be constructed as a link magnet. In the case of such an embodiment, the magnetic core is divided into two end pieces and several connecting links. The end pieces are firmly screwed to the coil body, and the links can move freely in the coil box opening and follow the unevenness of the rail.

Concerning the construction of electromagnetic rail brakes, reference is made to the publication "Brakes for Rail Vehicles", *Manual of Brake-Related Terms and Values*, Page 45, by Knorr-Bremse AG, München, 1990.

In the case of electromagnetic rail brakes according to the state of the art, St37 steel is preferably used for friction materials in the pole shoe section. The use of a St37 friction layer has the disadvantage that buildups occur increasingly which considerably reduce the braking force of the brake. In order to restore this braking force, it was necessary to manually remove the buildup, which caused high maintenance costs. Although the use of GGG40 cast steel resulted in less buildup, only low braking forces could be applied by such friction layers.

A friction material which is distinguished by a low buildup tendency and permits a sufficient service life is, for example, a sintered material as a friction material for the pole shoe section. The sintered material contains at least one fraction of pulverized wear inhibitor and one fraction of a protective-layer-forming powder.

A disadvantage of the use of sintered materials as the friction material was the problem that, as the wear of the pole shoes increased, the holding force and therefore also the braking forces to be generated increased considerably. These braking forces rose to twice to three times the forces in the worn condition.

SUMMARY OF THE DISCLOSURE

In the present electromagnetic rail brake, in the case of which, for example, sintered materials can be used as friction material for the pole shoe section for avoiding buildups, where the disadvantages of the prior art are avoided. The magnetic base body and/or support body comprises materials of different characteristic magnetization curves, so that a rise of the induction in the air gap between the electromagnetic rail brake and the rail is reduced as the wear in the pole shoe section increases. As a result of the combination of materials with different characteristic magnetization curves in the magnetic circuit, the induction, which increases as a result of the wear of the pole shoes, drives the materials in certain areas of the base body farther into the magnetic saturation and thus counteracts a rise of the holding force. That is, a rise of the induction in the air gap between the electromagnetic rail brake and the rail. The magnetic base body and/or support body, in each case, comprises two legs and an intermediate area between the legs. In each case, the two legs comprise a first magnetic material, and the intermediate area between the legs comprises a second magnetic material. The second magnetic material, which is inserted between the legs, is a material which has a characteristic magnetic curve different from that of the base material, that is, from the material of the legs, and has the required magnetic characteristics.

The advantage of the present invention is particularly that a constant braking force is ensured for the service life of the pole shoes. A higher mechanical stressing of the electromagnetic rail brake connected with an increase of the braking forces can therefore be prevented.

These and other aspects of the present disclosure will become apparent from the following detailed description of the disclosure, when considered in conjunction with accompanying drawings.

DETAILED DESCRIPTION OF THE DRAWINGS

Figure 1:
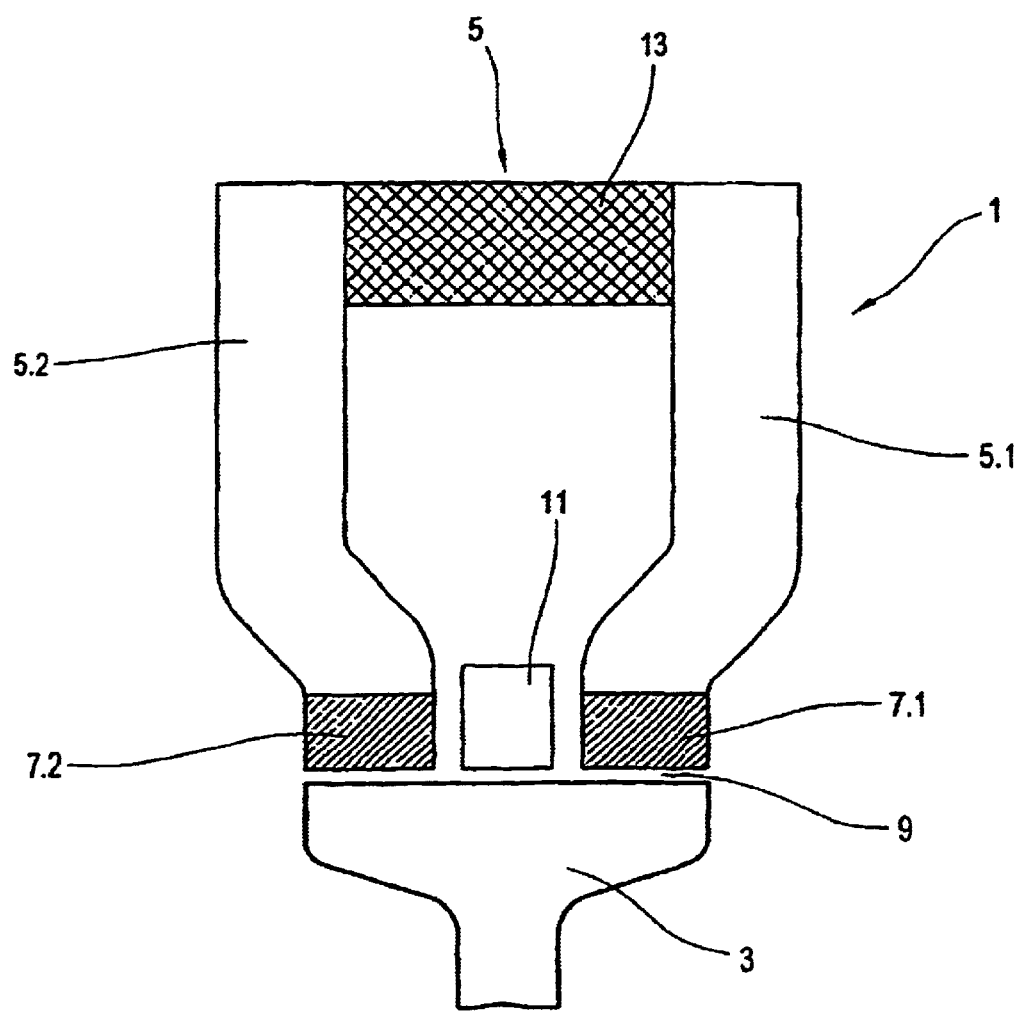
FIG. 1 is a schematic view of a rail piece with an electromagnetic brake with pole shoes.

An electromagnetic rail brake 1 illustrated in FIG. 1 consists of a coil, which is not shown and extends in the longitudinal direction of a rail 3, and of a magnetic core or base body or support body 5 whose legs 5.1 and 5.2 extend parallel to one another. Pole shoes 7.1, 7.2 are arranged at the ends of the legs 5.1 and 5.2. An air gap 9 is constructed between the pole shoes 7.1, 7.2 and the rail head of the rail 3. The pole shoes are preferably constructed of a friction material, particularly of a sintered material.

An a magnetic, extremely wear-resistant, shock-resistant and temperature-stable intermediate strip 11, can be arranged in the intermediate space between the left and the right pole shoe 7.1, 7.2 (north and south pole respectively).

The magnetic base body and/or support body comprises two materials of different characteristic magnetization curves. In the present case, a first material is used for the two legs 5.1, 5.2 and a second magnetic material is used for the base body intermediate area 13 between the two legs 5.1, 5.2 of the base body. The second magnetic material in the base body intermediate area 13 is distinguished by such a characteristic magnetization curve that, when, as a result of the wear of the pole shoes, because of the shorter path, that is, the decreasing air gap 9, the magnetic reluctance is reduced and the induction increases. The second material of the base body intermediate area 13, which differs from the material of the legs 5.1, 5.2, is driven farther into the magnetic saturation, and therefore a rise of the holding force, that is, a rising of the induction in the air gap 9 is counteracted.

Thus, an electromagnetic rail brake is provided for the first time which is distinguished by a braking force which remains constant for the service life of the pole shoes, so that a higher mechanical stressing of the electromagnetic rail brake connected with the increase of the braking forces is reduced.

Although the present disclosure has been described and illustrated in detail, it is to be clearly understood that this is done by way of illustration and example only and is not to be taken by way of limitation. The scope of the present disclosure is to be limited only by the terms of the appended claims.

We claim:

1. An electromagnetic rail braking device comprising:
   a magnetic body for receiving a coil of an electromagnet and forming a closed flux path with a rail when the coil is activated;
   a pole shoe section of the magnetic body to be adjacent the rail head;
   the magnetic body including two legs and an intermediate area connecting the legs; and
   the two legs are of a first magnetic material and the intermediate area between the legs is of a second magnetic material having different characteristic magnetization curves, so that a rise of the induction in the air gap between the electromagnetic rail brake device and the rail head is reduced as the wear in the pole shoe section increases.

2. The electromagnetic rail braking device according to claim 1, wherein the part of the pole shoe section facing the rail comprises a friction material.

3. The electromagnetic rail braking device according to claim 2, wherein the friction material is a sintered material.

4. The electromagnetic rail braking device according to claim 1, including an intermediate strip in a gap of the pole shoe section extending in the longitudinal direction of the magnetic rail brake.

5. The electromagnetic rail braking device according to claim 1, including an intermediate strip between the legs.

* * * * *